(12) United States Patent
Ionescu et al.

(10) Patent No.: US 11,886,596 B2
(45) Date of Patent: *Jan. 30, 2024

(54) PRECISION-TUNED RUNTIME MONITORING

(71) Applicant: International Business Machines Corporation, Armonk, NY (US)

(72) Inventors: Paul Ionescu, Kanata (CA); Iosif V. Onut, Ottawa (CA); Omer Tripp, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/807,344

(22) Filed: Mar. 3, 2020

(65) Prior Publication Data

US 2020/0202010 A1 Jun. 25, 2020

Related U.S. Application Data (60) Continuation of application No. 16/237,940, filed on Jan. 2, 2019, now Pat. No. 10,621,358, which is a division of application No. 15/083,330, filed on Mar. 29, 2016, now Pat. No. 10,210,336.

(51) Int. Cl.
  *H04L 29/06* (2006.01)
  *G06F 21/57* (2013.01)
  *G06F 21/51* (2013.01)
  *G06F 21/52* (2013.01)

(52) U.S. Cl.
  CPC ............ *G06F 21/577* (2013.01); *G06F 21/51* (2013.01); *G06F 21/52* (2013.01); *G06F 2221/033* (2013.01)

(58) Field of Classification Search
  CPC ............ H04L 63/1416; H04L 63/1408; H04L 63/1441; H04L 63/1458; G06F 21/552
  USPC .......................................................... 726/25
  See application file for complete search history.

(56) References Cited

U.S. PATENT DOCUMENTS

| | | | |
|---|---|---|---|
| 7,610,523 B1 * | 10/2009 | Singh | G11C 29/52 365/201 |
| 8,793,665 B2 | 7/2014 | Murthy | |
| 8,881,293 B1 | 11/2014 | Brucker et al. | |
| 8,943,600 B2 | 1/2015 | Tripp | |
| 10,210,336 B2 | 2/2019 | Ionescu et al. | |
| 2005/0283834 A1 * | 12/2005 | Hall | G06F 21/577 713/188 |
| 2009/0249306 A1 | 10/2009 | Li et al. | |

(Continued)

OTHER PUBLICATIONS

Enck et al., "TaintDroid: An Information-Flow Tracking System for Realtime Privacy Monitoring on Smartphones," To appear at the 9th USENIX Symposium on Operating Systems Design and Implementation (OSDI'10), 15 pages.

(Continued)

*Primary Examiner* — Evans Desrosiers
(74) *Attorney, Agent, or Firm* — Peter J. Edwards (57) ABSTRACT

Preliminary program analysis of an executable may be performed. A security vulnerability level of a portion of the executable may be determined based on the preliminary program analysis. The security vulnerability level of the portion may be compared to a security vulnerability threshold. The precision of runtime monitoring of the portion may be tuned based on the comparison.

19 Claims, 8 Drawing Sheets

(56) References Cited

U.S. PATENT DOCUMENTS

| | | | | |
|---|---|---|---|---|
| 2010/0083240 | A1* | 4/2010 | Siman | G06F 16/245 717/144 |
| 2011/0145260 | A1* | 6/2011 | Ichino | G06F 16/9014 707/747 |
| 2012/0185943 | A1* | 7/2012 | Tripp | G06F 21/56 717/130 |
| 2014/0173737 | A1* | 6/2014 | Toback | G06F 21/57 726/25 |
| 2014/0189868 | A1* | 7/2014 | Laniepce | G06F 21/552 726/23 |
| 2015/0013011 | A1 | 1/2015 | Brucker et al. | |
| 2017/0200006 | A1* | 7/2017 | Gershoni | G06Q 10/06 |
| 2017/0286688 | A1 | 10/2017 | Ionescu et al. | |
| 2019/0138733 | A1 | 5/2019 | Ionescu et al. | |

OTHER PUBLICATIONS

Xia et al, "Effective Real-time Android Application Auditing," 2015 IEEE Symposium on Security and Privacy, pp. 899-914, @ 2015, Mingyuan Xia. Under license to IEEE. DOI 10.1109/SP.2015.60.

Trustwave, "Cenzic is now part of Trustwave," Printed on Dec. 13, 2015, 3 pages, Copyright @ 2015 Trustwave Holdings, Inc. All rights reserved.

Tripp et al, "Finding Your Way in the Testing Jungle," ISSTA '13, Jul. 15-20, 2013, 11 pages, Lugano, Switzerland, Copyright 13, ACM 978-1-4503-2159-4/13/07.

Tripp et al., "TAJ: Effective Taint Analysis of Web Applications," PLDI'09, Jun. 15-20, 2009, 11 pages, Dublin, Ireland, Copyright 2009, ACM 978-1-60558-392-Jan. 9, 2006.

Sagiv et al., "Parametric Shape Analysis via 3-Valued Logic," POPL 99 San Antonio, Texas, pp. 105-118, Copyright ACM 1999 I-581 13-095-3/99/01.

Gartner, "Runtime Application Self-Protection (RASP)," It Glossary, Printed on Dec. 13, 2015, 3 pages http://www.gartner.com/it-glossary/runtime-application-self-protection-rasp.

Lev-Ami et al., "TVLA: A System for Implementing Static Analyses, " Static Analysis, vol. 1824 of the series Lecture Notes in Computer Science, 22 pages.

Ionescu et al., "Precision-Tuned Runtime Monitoring," U.S. Appl. No. 15/083,330, filed Mar. 29, 2016.

Ionescu et al., "Precision-Tuned Runtime Monitoring," U.S. Appl. No. 16/237,940, filed Jan. 2, 2019.

List of IBM Patents or Patent Applications Treated as Related, Dated Feb. 25, 2020, 2 pages.

* cited by examiner

PRECISION-TUNED RUNTIME MONITORING

BACKGROUND

The present disclosure relates to computer-system security, and more specifically, to security of web-enabled software.

Typical security solutions for web-enabled software entails preemptive detection, to be solved with further development, and runtime monitoring. Results from pre-emptive-detection techniques typically are used in subsequent development efforts to eliminate the source of vulnerabilities. Runtime monitoring is typically used to detect and block software attacks as they occur.

SUMMARY

Some embodiments of the disclosure can be illustrated by a method of tuning the precision of runtime monitoring of an executable. In the method, a processor may perform preliminary program analysis of an executable. Based on that preliminary program analysis, the processor may determine a security vulnerability of a portion of the executable. The processor may then compare the security vulnerability of the portion to a security vulnerability threshold. Based on that comparing, the processor may then tune the precision of runtime monitoring of the portion.

Some embodiments of the present disclosure can also be illustrated by a system configured to perform a method of tuning the precision of runtime monitoring of an executable. The system may contain a processor configured to perform shape analysis of the executable such that the shape analysis is restricted to the execution prefixes of the executable. Based on the preliminary program analysis, the processor may determine an execution-prefix length limit, such that any execution prefixes with a length higher than the execution-prefix length limit are likely to exhibit a security vulnerability level below a security vulnerability threshold. The processor may store the execution-prefix length limit in an oracle. The processor may the access the oracle. The processor may further be configured to tune runtime monitoring of the executable to monitor prefixes with a prefix length lower than the prefix length limit with high precision and to monitor prefixes with a prefix length lower than the prefix length limit with low precision.

Some embodiments of the present disclosure can also be illustrated by a computer program product, the computer program product comprising a computer readable storage medium having program instructions embodied therewith. When executed, the program instructions may cause the computer to compute, in a first phase and in response to receiving an input comprising a code portion representing a program P having execution prefixes and further comprising an identification of a prefix length bound by n, a control flow graph G of the program P. The program instructions may further cause the computer to apply a breadth first search traversal over the control flow graph G up to the limit of n to create a set S of finite execution prefixes of length less or equal to n. The program instructions may further cause the computer to apply a shape analysis selected from a set of predefined analyses, over each of one or more path prefixes in the set S to determine a respective security status, wherein the selected shape analysis is applied over only the execution prefixes of the program P. The program instructions may further cause the computer to record each mapping from an execution prefix to a respective security status as an oracle O. The program instructions may further cause the computer to in a second phase at runtime, apply the oracle O, in an online enforcement algorithm utilizing information computed by the selected shape analysis to precisely monitor for security concerns along a given execution prefix in the set S of finite execution prefixes as the finite execution prefixes unfold, wherein all execution prefixes are enumerated and accounted for, and full coverage up to the limit of n is obtained. The program instructions may further cause the computer to perform conservative monitoring of the program P at runtime beyond a prefix of length n, by the oracle.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to computer-system security, and more specifically, to security of web-enabled software. While the present disclosure is not necessarily limited to such applications, various aspects of the disclosure may be appreciated through a discussion of various examples using this context.

Web applications (sometimes referred to herein as "web executables," or simply "executables") are applications that are able to be accessed from a remote location. These executables may be accessible, for example, from an internet browser, email application, or other application that may communicate with the web executable over the Internet. Web executables may be accessible, through these means, by a standard computer, smart phone, tablet, or any other computing device with internet functionality. Given the variety of methods for accessing web executables and the potential to access the executables from nearly any location at any time, web executables may be vulnerable to software attacks by parties that are anonymous and unmonitored.

Efforts to detect and eliminate these vulnerabilities may be referred to herein as program analysis. Program analysis that is performed without executing the executable being analyzed is referred to as static analysis, while program analysis that is performed while the executable being analyzed is executing is referred to as dynamic analysis. Dynamic analysis may be performed in an offline state (e.g., a web executable may be tested without internet connectivity enabled) or an online state (e.g., a web executable may be tested while connected to the Internet). Some types of program analysis are static, some types are dynamic, and other types may be performed in either a static or a dynamic fashion.

Shape analysis, for example, is one type of static analysis. Shape analysis involves the discovery and verification of properties of linked data structures. Shape analysis functions by determining the object or set of objects to which a pointer in an executable may point. Shape analysis is typically a precise form of program analysis, and thus may be effective at identifying vulnerabilities in executables. However, due to the resources required to perform shape analysis, shape analysis typically does not scale well to industry-level usage in which very large, demanding executables are analyzed.

Taint analysis, another form of program analysis, is a form of verification that may be performed statically or dynamically. Both static and dynamic taint analysis typically function by analyzing the variables of an executable to attempt to identify vulnerable variables. Typically these variables represent storage locations paired with identifiers, which together contain information. The identified variables may be vulnerable because they store sensitive or untrusted data, or because they could be modified by a user in a way that has significant effects the executable. Identification of these variables helps to enable software developers to design safeguards for these variables to prevent malicious interaction with an executable. However, taint analysis, like shape analysis, typically does not scale well to industry-level usage. Further, taint analysis may identify some variables that are not used, or that are infrequently used, as high risk. This can result in expensive development time being dedicated to the creation of safeguards for these variables. This development time may sometimes be at the expense of development time that would otherwise be allocated to the consideration of variables that are labeled as exhibiting lower risks, but that may be used very frequently, causing their actual risk to be higher.

Testing, a form of dynamic analysis, involves executing an executable and logging program errors. Testing may be performed virtually, by a testing program, or live, by a person. While testing may target functionality that is used frequently, both virtual testing and live testing may be resource intensive. Virtual testing may require significant resources to design a tester that is able to execute an executable being analyzed and focus on high-use functionality. Live testing, however, typically involves compensating software personnel to test of the executable. In industry-scale usage, these resources may be cost-prohibitive.

Some forms of program analysis may actually identify portions of an executable that are unlikely to be vulnerable. These forms of program analysis are often used to determine the portions of an executable that are less likely to require further development work. Trademarking, for example, is a form of program analysis that may be used to identify software objects (e.g., variables) that cannot be changed after they are created, and are thus more trustworthy (i.e., less vulnerable) than an object that may be changed. These unmodifiable objects may be referred to as "immutable." Trademarking is thus often viewed as the opposite of taint analysis.

Shape analysis, taint analysis, testing, trademarking, and other forms of program analysis typically operate with the objective to identify potential vulnerabilities (or lack thereof), either statically or dynamically, which may then be fixed in further development. Runtime monitoring, a form of dynamic analysis, focuses instead on the enforcement of vulnerability protection during execution. Runtime monitoring typically involves analyzing the operations of an executable to detect and block activities of potential security concern. These activities may include, for example, queries sent by a user, or an unexpected type of data or a command being sent in response to a query for basic information (e.g., a command to access a database being sent to the executable in response to an executable's query for a user's name).

Runtime monitoring involves monitoring activities associated with an executable as the executable runs and is used by users. The runtime system may track the flow of information, the origin of information, other properties of the data values being propagated throughout the executable, and other types of information. If the runtime-monitoring system is not able to monitor these activities and block potential security risks as quickly as the executable operates and is used, the runtime system may not be effective. Thus, effective usage of runtime-monitoring may require system resources sufficient to simultaneously run the executable and monitor the executable.

Thus, runtime monitoring may be an effective method of mitigating security vulnerabilities in many situations. The resources required to perform runtime monitoring, however, can cause runtime monitoring to be both expensive and a significant drain on the system used to run the executable being monitored. Investing in system resources to provide faster system performance may be prohibitively expensive in some cases. In other cases, even theoretically unlimited system investment may be unable to fully mitigate a drop in system performance, because the drop may not be resource related, but may be inherent in monitoring information as it moves through the executable.

In order to maintain executable performance during runtime monitoring, typical uses of runtime monitoring include monitoring the executable with less precision. In some instances this may lead to false negatives (potentially allowing security risks, including actual attacks, to go undetected), making security mitigation less effective and potentially ineffective. In other instances monitoring the executable with less precision may lead to false positives (potentially marking innocuous activity as a security risk), which may interfere with the usability of the executable. Thus, in typical usage, runtime monitoring may be expensive, a drain on executable performance, ineffective, or any combination of the foregoing.

Some embodiments of the present disclosure may improve upon runtime monitoring by applying runtime monitoring as part of a multiple-phase program-analysis system. The system may include a preliminary phase of program analysis followed by a phase of precision-tuned runtime monitoring. The preliminary phase of program analysis may be static or dynamic, and may occur while the system is offline (e.g., the executable is running, but not connected to the Internet) or online. In some embodiments, in addition to other potential benefits of the program analysis utilized in the preliminary phase (e.g., identification of vulnerabilities to eliminate in further development), the results of the program analysis may be used to tune subsequent runtime monitoring.

For example, the results of the program analysis may identify portions of an executable that may be likely to exhibit a security vulnerability level above a vulnerability threshold. The nature of these portions may depend on the type of program analysis used in the preliminary phase. For example, because taint analysis typically operates by reviewing the variables of an executable, the portions of the executable utilized as a result of taint analysis may include variables that are likely to have a security vulnerability level above a vulnerability threshold. Further, shape analysis may be used to determine vulnerable execution prefixes (also referred to herein as "command prefixes" or "prefixes") of an executable. In some embodiments, shape analysis may determine that an executable only exhibits vulnerabilities up to a certain prefix length. For example, shape analysis may determine that an executable is vulnerable up to a prefix length of thirty, which would imply that the first thirty command prefixes run by the executable may be vulnerable, but that all command prefixes following the thirtieth command prefix are less likely to be vulnerable. In some embodiments, the nature of the portion of the monitored executable may not be dependent on the type of program analysis. For example, multiple different types of program analysis may identify a particular command or class of commands as potentially vulnerable (e.g., a "change directory" command or any command that asks the executable to display the contents of a file).

In some embodiments utilizing a precise form of preliminary program analysis, such as shape analysis, may be beneficial. The results of the preliminary analysis may be used to configure a runtime system to monitor some portions of an executable with low precision and other portions with high precision. If the preliminary program analysis is imprecise (and thus the results potentially inaccurate), portions of the executable that are configured to be monitored with low precision may actually have a high level of vulnerability, and portions configured to be monitored with high precision may actually have a low level of vulnerability. At best this may waste system resources used in monitoring low-vulnerability portions and at worst increase the risk of security attacks. Thus, as the precision of preliminary analysis increase, the benefit of tuning runtime monitoring may increase.

However, precise program analysis, as discussed herein, may be resource intensive and may not scale well to industry-level usage. Thus, while utilizing precise program analysis on an entire executable may be an effective method of identifying the vulnerable portions of the executable to monitor during runtime, it may be impractical in some embodiments. In these and similar embodiments a precise form of program analysis may still be used in preliminary program analysis, but the program analysis may only be performed on a selection of the executable, rather than on the entire executable. In many executables, for example, many security vulnerabilities may relate to execution prefixes. In these executables, precise shape analysis may be performed only on the execution prefixes instead of over the entire executable. Further, certain variables that may otherwise be analyzed may be immutable objects, and thus theoretically invulnerable to attack. In executables with many such variables, taint analysis may be performed on only the non-immutable variables. In addition, certain commands may not have access to sensitive information or may be otherwise innocuous, and thus the risk of harm if those commands were to be attacked would be very low. In executables with many such commands, preliminary program analysis may be performed only on certain commands or types of commands. In these and similar embodiments, the precise preliminary program analysis may thus be limited to the selection of the executable that is expected to contain a high number of vulnerable portions. This may enable adherence to performance limitations of a computer system that is performing the preliminary program analysis while at the same time meeting the need for highly-accurate analysis results.

During or after preliminary program analysis, information on portions of an executable identified as vulnerable or potentially vulnerable may be stored in an oracle. This oracle may then be used to tune the precision of the runtime monitoring phase by identifying portions of the executable that may be monitored with high degree precision and portions of an executable that may be monitored with a low degree of precision. For example, portions of the executable that are identified by preliminary-phase program analysis as having a vulnerability level above a vulnerability threshold may be monitored with high precision in runtime monitoring, whereas portions with vulnerabilities below the threshold may be monitored with low precision.

While some embodiments of this disclosure are discussed as creating and analyzing oracles to store and use information related to the vulnerabilities of an executable identified in program analysis, in some embodiments this information may be stored in other objects. Further, while "oracle" is used herein as a term to describe an object that stores information to be used in the runtime-monitoring-tuning process, the term "oracle" may be understood in the field of software as a variety of mechanisms for determining whether a test has passed or failed. This disclosure is not intended to be limited to any particular meaning of the term "oracle" or any particular method of storing vulnerability information.

Figure 1:
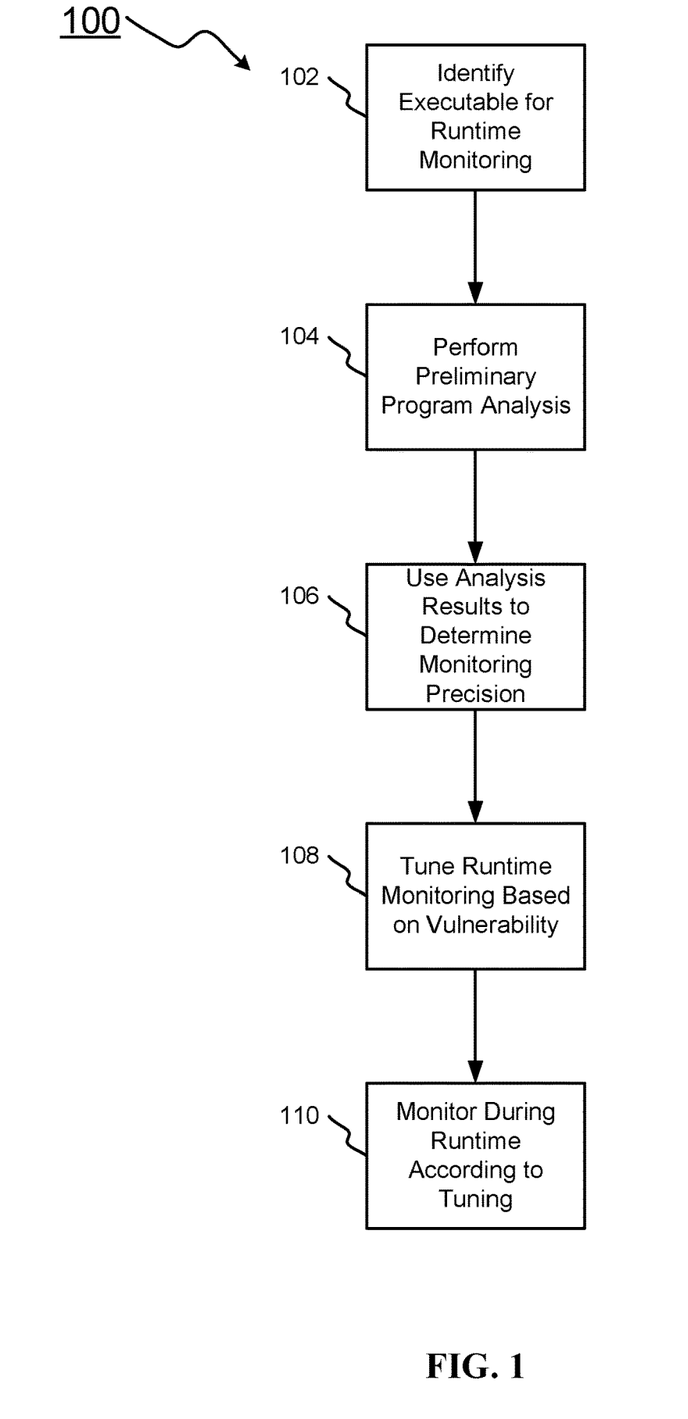
FIG. 1 depicts a flowchart of a method by which the present disclosure may be utilized in a security software application, in accordance with embodiments.

FIG. 1 illustrates a method 100 by which the present disclosure may be utilized in a security software application. In block 102, an executable for runtime monitoring is identified. In block 104, preliminary program analysis is performed on the executable. The method of preliminary analysis chosen should be capable of being used to determine vulnerability level of the portions of the executable, whether those portions take the form of prefixes, variables, commands, or other portions. In some embodiments the analysis results or other vulnerability information may be stored in an oracle. In block 106, the results of the analysis are analyzed to determine the monitoring precision. In some embodiments this determination may involve setting one or more vulnerability thresholds (e.g., a threshold security risk to which the amount of security risk of each portion of the executable may be compared). In such embodiments the portions of the executable with vulnerability levels above the vulnerability threshold may be determined as requiring precise runtime monitoring, whereas portions of the executable with vulnerability levels below the vulnerability threshold may be determined as requiring imprecise runtime monitoring. In some embodiments the information resulting from block 106 may also be stored in an oracle.

Once monitoring precision is determined in block 106, the configurations of runtime monitoring are tuned in block 108 to reflect the determined monitoring precisions. When the executable is run in block 110, the runtime system monitors the executable according to the tuned configurations.

Figure 2:
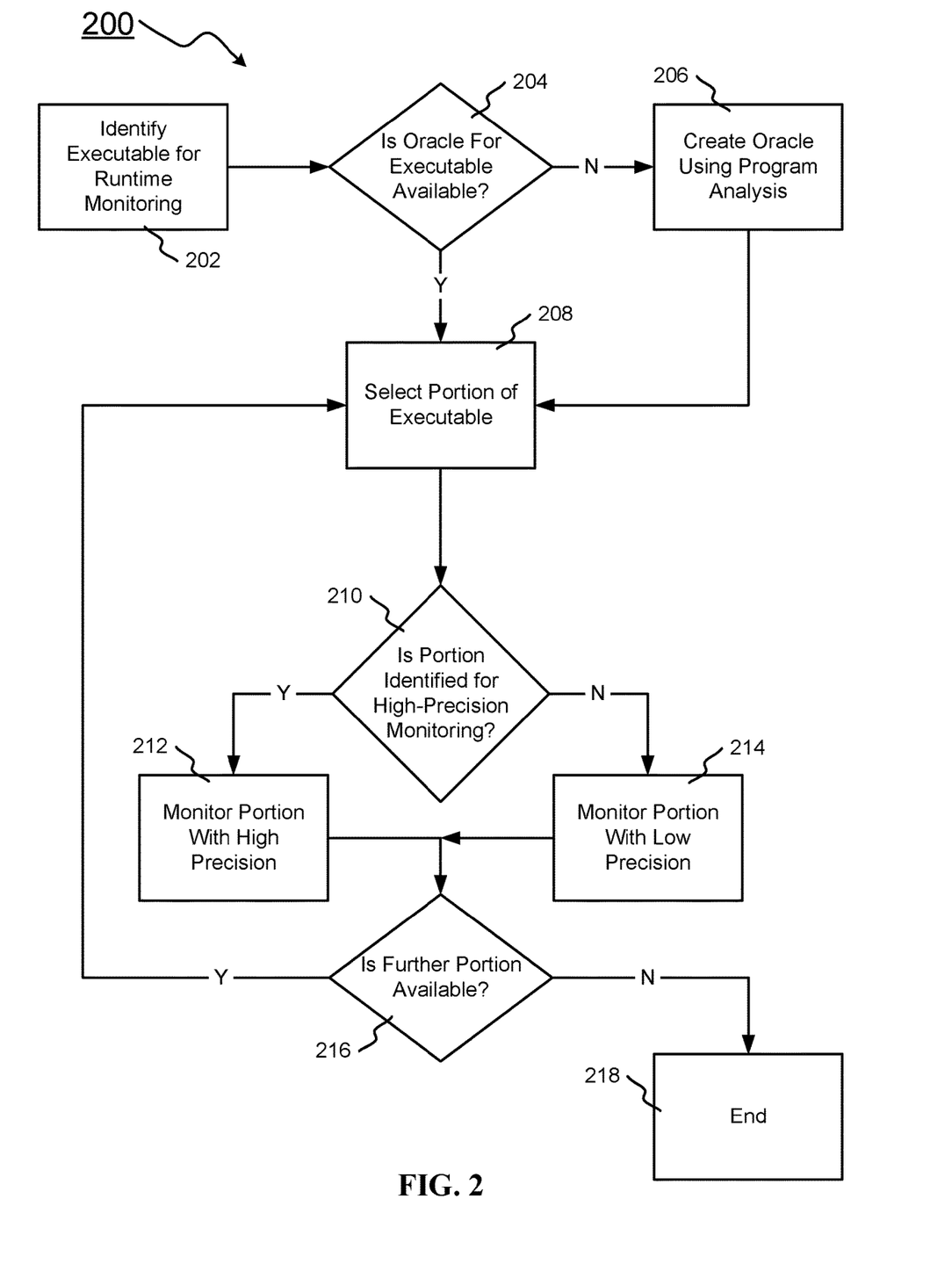
FIG. 2 depicts a flowchart of a method of tuning runtime monitoring, in accordance with embodiments.

FIG. 2 illustrates a method 200 of tuning runtime monitoring, according to embodiments. Method 200 may be performed, for example, by a computer system that administers the executables being monitored, such as a server system with security software installed. In this embodiment, method 200 begins when an executable is identified by the computer system for runtime monitoring in block 202. How the executable is identified may depend on when method 200 is being performed. In some embodiments runtime monitoring may be tuned preemptively, whereas in others it may be tuned when an executable is executed. It may be beneficial to tune runtime monitoring preemptively, for example, when first integrating the executable into a computer system, or periodically thereafter. In some preemptive uses, then, the executable may be identified in block 202 when the executable is integrated. In others, the computer system in which the executable is integrated may periodically check for executables for which runtime monitoring has not been tuned recently (e.g., within a minimum amount of time), and identify those executables for tuning in block 202. Additionally, it may be beneficial to tune runtime monitoring each time an executable is executed, such that the tuning of runtime monitoring is updated for each execution. In these uses, then, a computer system may identify an executable for tuning in block 202 when it detects the executable being executed.

After an executable is identified for tuning in block 202, the computer system determines in block 204 whether a program-analysis oracle is available that may be used to identify vulnerable portions of that executable. In some embodiments the oracle may contain a list of all portions of the executable that were identified in prior program analyses, and may further contain a vulnerability level for each listed portion. This oracle may be stored on the computer system or on a remote storage system. If an oracle is not available (e.g., an oracle has not yet been created), the computer system proceeds to block 206 to create an oracle for the executable. This may be performed by various methods of program analysis, and is discussed with further specificity in relation to FIG. 3.

If the computer system determines in block 204 that an oracle is available or creates an oracle in block 206, the computer system proceeds to analyze the oracle. In this embodiment analysis begins in block 208, in which the computer system selects a portion of the executable from the oracle. In this embodiment, once a portion is selected, the computer system determines in block 210 whether the portion was identified in the oracle for high-precision runtime monitoring. In some embodiments a portion is identified for high-precision monitoring based on whether the portion was determined, during prior program analysis, to exhibit a potential security risk above a vulnerability threshold.

Figure 4:
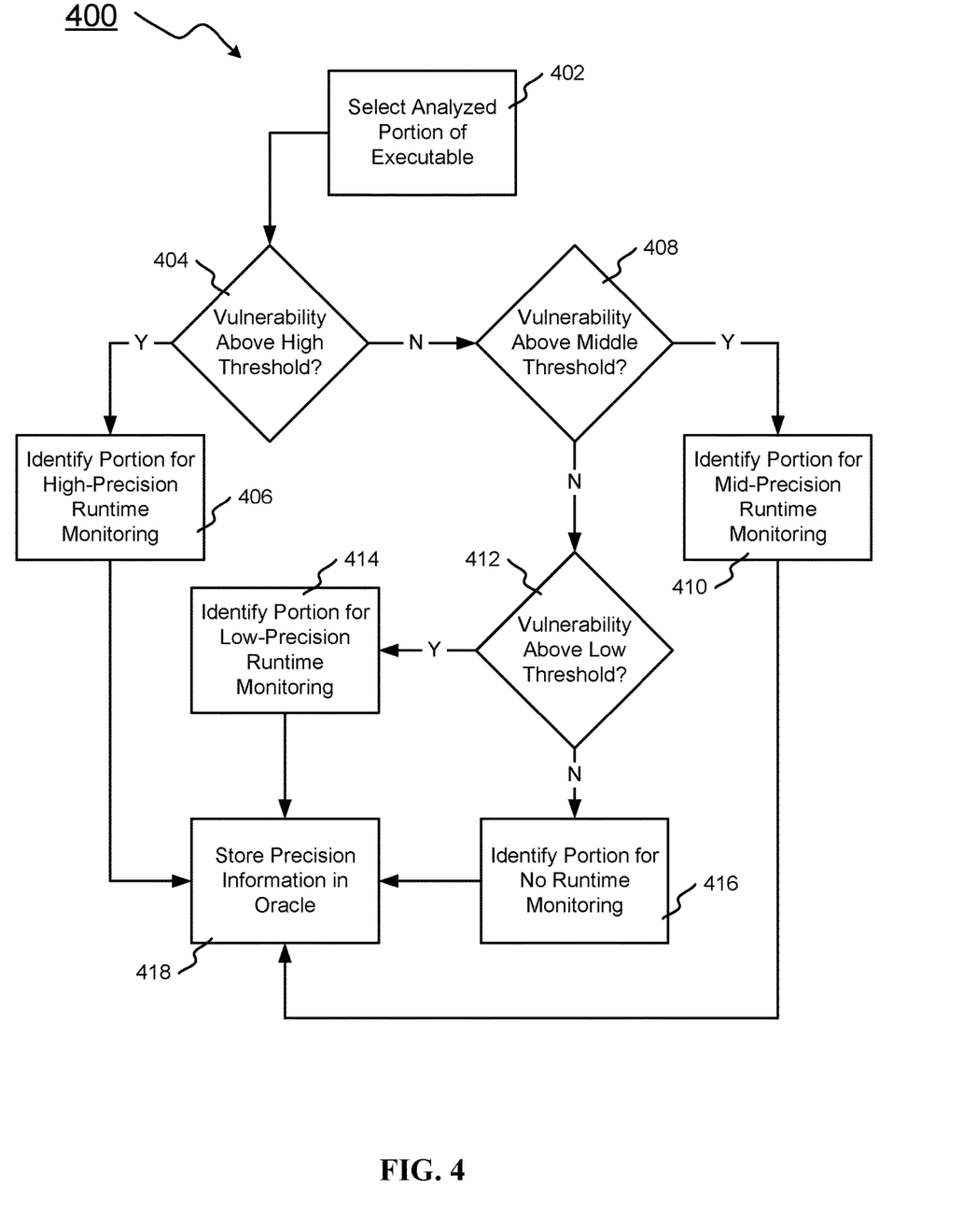
FIG. 4 depicts a flowchart of a method of developing an oracle utilizing multiple vulnerability thresholds, in accordance with embodiments.

In this embodiment, if the computer system determines in block 210 that the portion has been identified for high-precision monitoring, the computer system configures the portion to be monitored with high precision while the executable is being run, as shown in block 212. If, however the computer system determines in block 210 that the portion has been identified for low-precision monitoring, the computer system configures the portion to be monitored with low precision, as shown in block 214. In other embodiments, executing the operations of block 210 may include determining whether the portion has been identified as one of any number of monitoring precisions (e.g., very-high precision, high precision, standard precision, low precision, very-low precision, and no runtime monitoring), rather than determining high-precision or not high precision. The number of monitoring precisions with which a portion may be identified may be determined by the prior program analysis performed on the executable. In these embodiments, the computer system may be able to configure each portion with that number of monitoring precisions, rather than high precision in block 212 and low precision in block 214. A method of developing an oracle using multiple vulnerability thresholds is illustrated in FIG. 4.

After the computer system has configured the portion for the identified monitoring precision, the computer system determines in block 216 whether a further portion of the executable is available in the oracle to be configured. In this embodiment, if the oracle contains a further portion, the computer system proceeds to select that portion, as shown in block 208, and proceeds to configure it as depicted in blocks 210 and 212 or 214. If the oracle does not contain a further portion of the executable, the computer system ends the tuning process in block 218.

After the runtime monitoring for an executable is tuned by method 200, the computer system may have a list of all portions of the executable and the precisions by which those portions are configured to be monitored during runtime. Thus, in some embodiments, when an executable for which monitoring has been tuned is executed, the runtime system may monitor with high precision only the portions of the executable that have been configured for high-precision monitoring; all other portions may be monitored with low precision. While this may reduce the resources required for runtime monitoring, it is unlikely to reduce the efficacy of runtime monitoring. Thus, this selective runtime monitoring may enable runtime systems of less capability (e.g., memory and processing power) to monitor executables with the same level of efficacy as runtime systems of far greater capability (and thus cost) if those greater-capability systems are not utilizing selective runtime monitoring. Further, because portions of executables that have been identified as low risk or no risk are not being monitored with high precision, runtime-system resources that would otherwise be used to monitor those portions may be freed up to be utilized to increase the performance of the executable.

Figure 3:
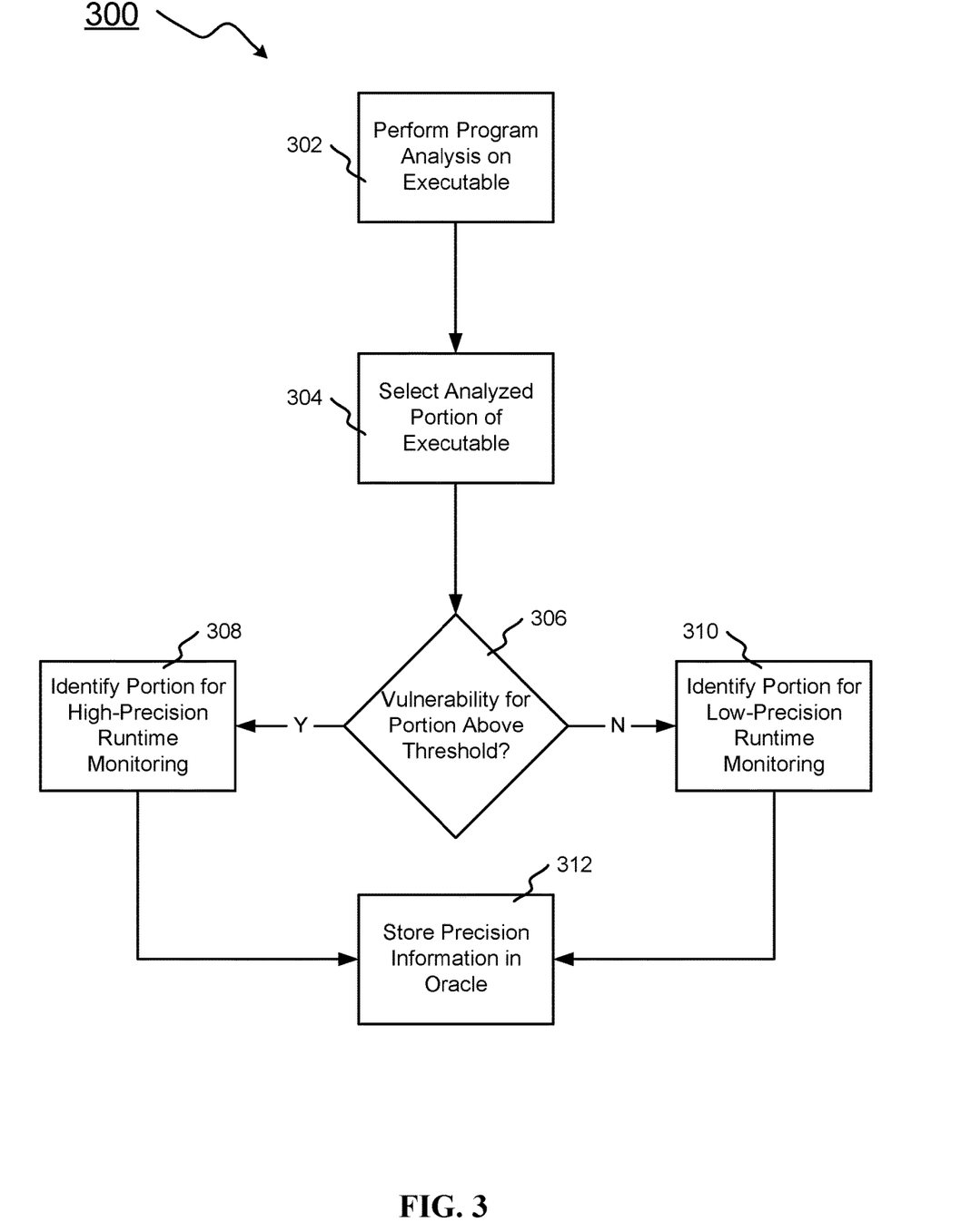
FIG. 3 depicts a flowchart of a method by which the results of program analysis may be utilized to develop an oracle for runtime-monitoring tuning, in accordance with embodiments.

FIG. 3 illustrates a method 300 by which the results of program analysis may be utilized to develop an oracle for runtime-monitoring tuning, according to embodiments. In some embodiments, method 300 may be performed by the same computer system that performed method 200. In other embodiments, method 300 may be performed by a different computer system, which may then make the resulting oracle available to the computer system performing method 200. Method 300 begins by performing program analysis in block 302 on the executable for which the oracle is to be developed. In some embodiments, the program analysis may include utilizing shape analysis, program testing, taint analysis, trademarking, runtime monitoring, or other techniques.

In some embodiments, method 300 may actually include repeating the operations block 302 multiple times until a pattern of vulnerability is observed. For example, a computer system may perform runtime monitoring every time an executable is executed, and over time may detect patterns, such as a pattern that a monitored type of command or a monitored prefix length is never attacked. In this case, the multiple iterations of runtime monitoring may be used as the program analysis described in block 302, and the pattern detected may be used to identify vulnerable portions of the executable for an oracle.

After program analysis is completed, or while it is in progress, the computer system selects, at block 304, a portion of the executable 3 that has been analyzed in block 302. The nature of the portion selected may depend on the type of program analysis performed in block 302. For example, shape analysis may identify vulnerable prefixes of the executable, which could then be used as portions. Vulnerable variables may be used as portions if taint analysis is utilized in block 302.

After a portion has been selected in block 304, the computer system determines in block 306 whether that portion was determined in block 302 to have a likelihood of vulnerability level above a vulnerability threshold. This vulnerability threshold may be, for example, a likelihood expressed as a percentage that a user of the executable could attack that portion. The vulnerability threshold may also take into account the expected harm (e.g., economic damage or information loss) that may result from such an attack. For example, the threshold may be a product of an equation in which one factor is a likelihood of a successful attack, expressed as a decimal, and another factor is the potential harm that could result from such an attack. In such an example a prefix length for which a very high likelihood of successful attack has been determined, but for which no danger would result if attacked, may be likely to exhibit a vulnerability level below the vulnerability threshold. However, a prefix length for which a low likelihood of successful attack has been determined, but for which severe harm would result if attacked, may be likely to exhibit a vulnerability level above the vulnerability threshold.

If the computer system determines in block 306 that the selected portion of the executable has a vulnerability level above the threshold, it proceeds to identify that portion for high-precision runtime monitoring in block 308 and stores that information in an oracle in block 312. If, however, the computer system determines that the portion does not have a vulnerability level above the threshold, it proceeds to identify that portion for low-precision runtime monitoring in block 310 and stores that information in an oracle in block 312.

In some embodiments, method 300 may be performed for each portion of the executable that was analyzed in preliminary-phase program analysis. In other embodiments, however, the computer system may only store information on certain portions of an executable in the oracle. For example, it may be beneficial to only store information on a portion if that portion were identified as vulnerable. This may decrease oracle size, potentially reducing the storage space necessary to store the oracles of the executables of a computer system. Smaller oracles may also be transferred faster between computer systems or components thereof, which may be beneficial if runtime-monitoring tuning is configured to be performed at time of execution of an executable, rather than preemptively.

FIG. 4 illustrates a method 400 of developing an oracle utilizing multiple vulnerability thresholds, rather a single vulnerability threshold. Method 400 may be performed by the same computer system that performs one or both of a preliminary-phase program analysis and runtime-monitoring tuning, or it may be a separate computer system. If a separate computer system, it may receive preliminary-phase program-analysis information from the computer system performing preliminary-phase program analysis, and may provide the developed oracle to the computer system that performs runtime-monitoring tuning.

Method 400 begins when the computer system selects in block 402 a portion of an executable that was analyzed in preliminary-phase program analysis. The computer system then determines in block 404 whether that portion was identified as exhibiting a vulnerability level above a high vulnerability threshold. If the computer system determines that the portion does exhibit a vulnerability level above the high threshold, it identifies the portion for high-precision runtime monitoring in block 406. If, on the other hand, the computer system determines that the portion does not exhibit a vulnerability level above the high threshold, it determines in block 408 whether the portion exhibits a vulnerability level above a middle threshold.

If the computer system determines that the portion does exhibit a vulnerability level above the middle threshold, it identifies the portion for mid-precision runtime monitoring in block 410. If, on the other hand, the computer system determines that the portion does not exhibit a vulnerability level above the middle threshold, it determines in block 412 whether the portion exhibits a vulnerability level above a low threshold.

If the computer system determines that the portion does exhibit a vulnerability level above the low threshold, it identifies the portion for low-precision runtime monitoring in block 414. If, on the other hand, the computer system determines that the portion does not exhibit a vulnerability level above the low threshold, it identifies the portion for no runtime monitoring in block 416.

In this embodiment, the computer system stores the precision information in an oracle in block 418 regardless of whether the computer system identified the portion for high-precision monitoring in block 406, mid-precision monitoring in block 410, low-precision monitoring in block 414, or no monitoring in block 416. However, in some embodiments only information for certain precisions may be stored in the oracle. For example, in some embodiments the computer system may only store information for high, middle, and low vulnerability-portions in the oracle. In such embodiments the computer system may also store instructions in the oracle in block 418 specifying that any portion for which no information is found in the oracle does not require monitoring during runtime. In some embodiments, method 400 may be repeated for every portion of the executable, whereas in other embodiments the computer system may perform method 400 for selected portions of the executable.

Some embodiments of the present disclosure that have been presented utilize two phases of program analysis: a first phase, the results of which are used to create an oracle, and a second phase, a phase of precision-tuned runtime monitoring. This is for the purpose of presenting understandable embodiments, but is not meant to limit the disclosure; in some embodiments more phases may be involved. For example, in some embodiments, runtime monitoring may be tuned using an oracle or multiple oracles resulting from several phases of program analysis. For example, a first oracle may be developed from the results of a shape analysis of an executable and a second oracle may be developed from the results of a taint analysis. These two oracles may be considered together or separately.

Some embodiments of the present disclosure may also involve an iterative process in which the results of precision-tuned runtime monitoring are used to develop an oracle for further tuning the runtime monitoring for the executable. These embodiments may also use oracles from other methods of program analysis at each iteration, or may utilize only runtime-monitoring oracles.

Some embodiments of the present disclosure may determine a prefix length limit prior to preliminary program analysis, and perform preliminary program analysis only the set of executable prefixes below that prefix length limit. The results of such restricted program analysis may be used to develop an oracle with specific monitoring instructions for the runtime system to follow when monitoring the prefixes within that set. Such embodiments may also utilize a breadth-first search of a control-flow graph to determine a prefix length limit.

Figure 5:
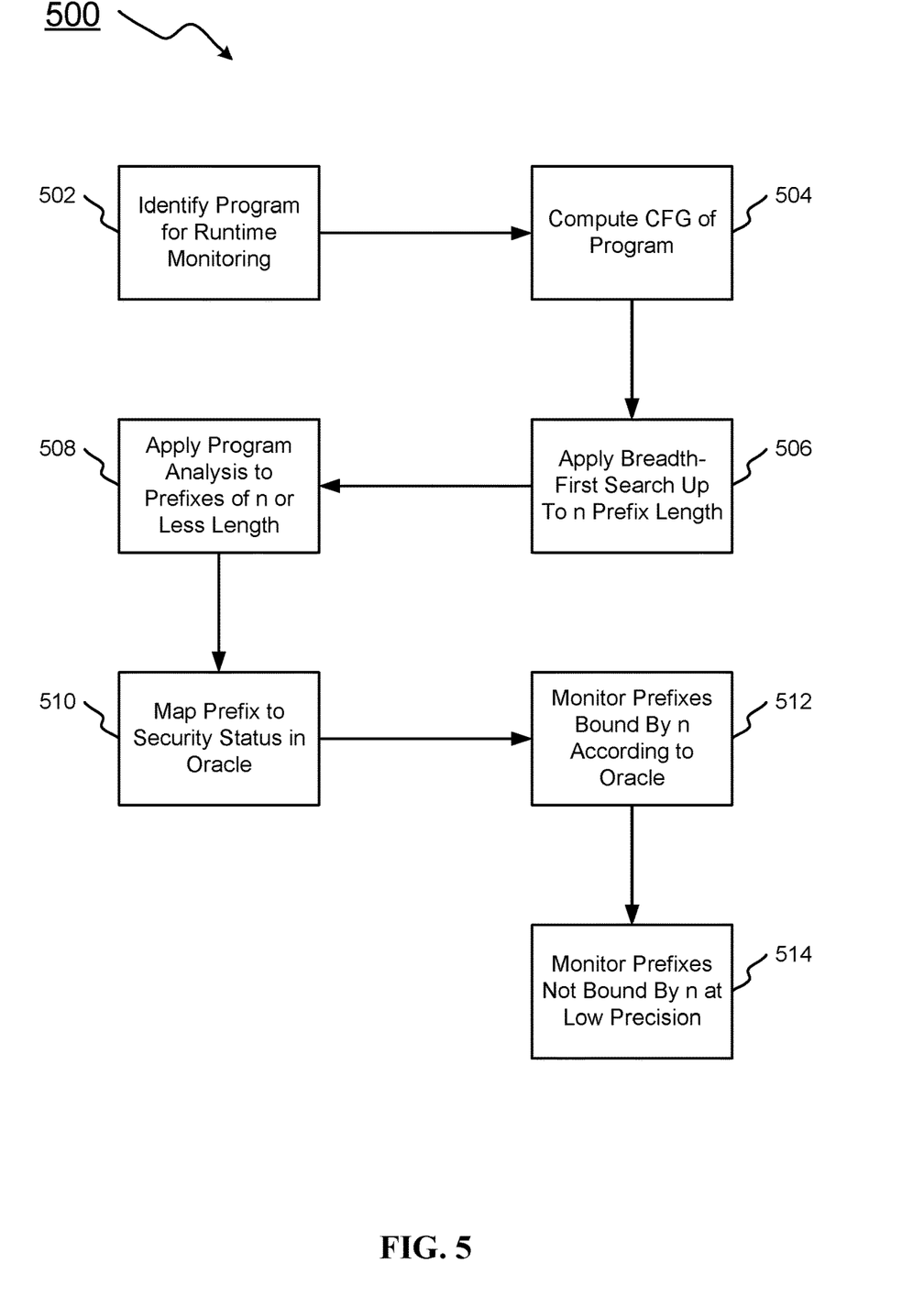
FIG. 5 depicts a flowchart of a method in which a control-flow graph is utilized to prepare preliminary program analysis, in accordance with embodiments.

FIG. 5 depicts a method 500 in which a control-flow graph is utilized to prepare preliminary program analysis. The method begins in block 502 when a program is identified. In some embodiments this may take the form of receiving a code representing a program as an input. The input may also contain a prefix length limit by which primary analysis is to be bound, (e.g., for a prefix length limit of n prefixes, the input may contain information noting that the prefix lengths are bound by n). A control-flow graph may be computed for the program in block 504. This control-flow graph may be a graphical representation of the paths that might be traversed through a program during its execution, and may be an inter-procedural control-flow graph.

For example, a control-flow graph may be represented by a process tree. In such a tree, the trunk would represent the initiation of the executable. The branches most proximal to the trunk would represent the first prefixes that may be performed upon initiation and the branches proceeding from those prefixes would represent the prefixes that may be performed after those initial prefixes. The most distal branches of the tree would represent the final operations performed at the close of the executable path (e.g., "end"). The particular branches taken from the root to any most distal branch would represent the path taken by the executable from beginning to end.

A breadth-first search performed to the input prefix length limit of n (where "n" may be, for example 200 prefixes) may be performed on the control-flow graph in block 506. Such a breadth-first search may be performed on a process tree of the control-flow graph by first analyzing the trunk, followed by the most proximal branches, followed by the second-most proximal branches, and so on. In block 508, program analysis may be performed on the prefixes in the set of prefixes bound by n (e.g., prefixes within the first 200 prefixes). In some embodiments this program analysis may be any method of program analysis chosen from a set of predefined program analyses. The program analysis may be utilized to determine a security status for each prefix in the set of prefixes. These security statuses may be mapped to their respective prefixes in an oracle in block 510. During runtime, an online enforcement algorithm may utilize the information from the oracle analyze security concerns of the enumerated prefixes in the set while monitoring the executable in block 512. Also at runtime and after prefixes bound by n have been executed, prefixes not bound by n (e.g., prefixes beyond the first 200 prefixes) may be monitored more conservatively (e.g., less precisely), utilizing the oracle, in block 514.

Figure 6:
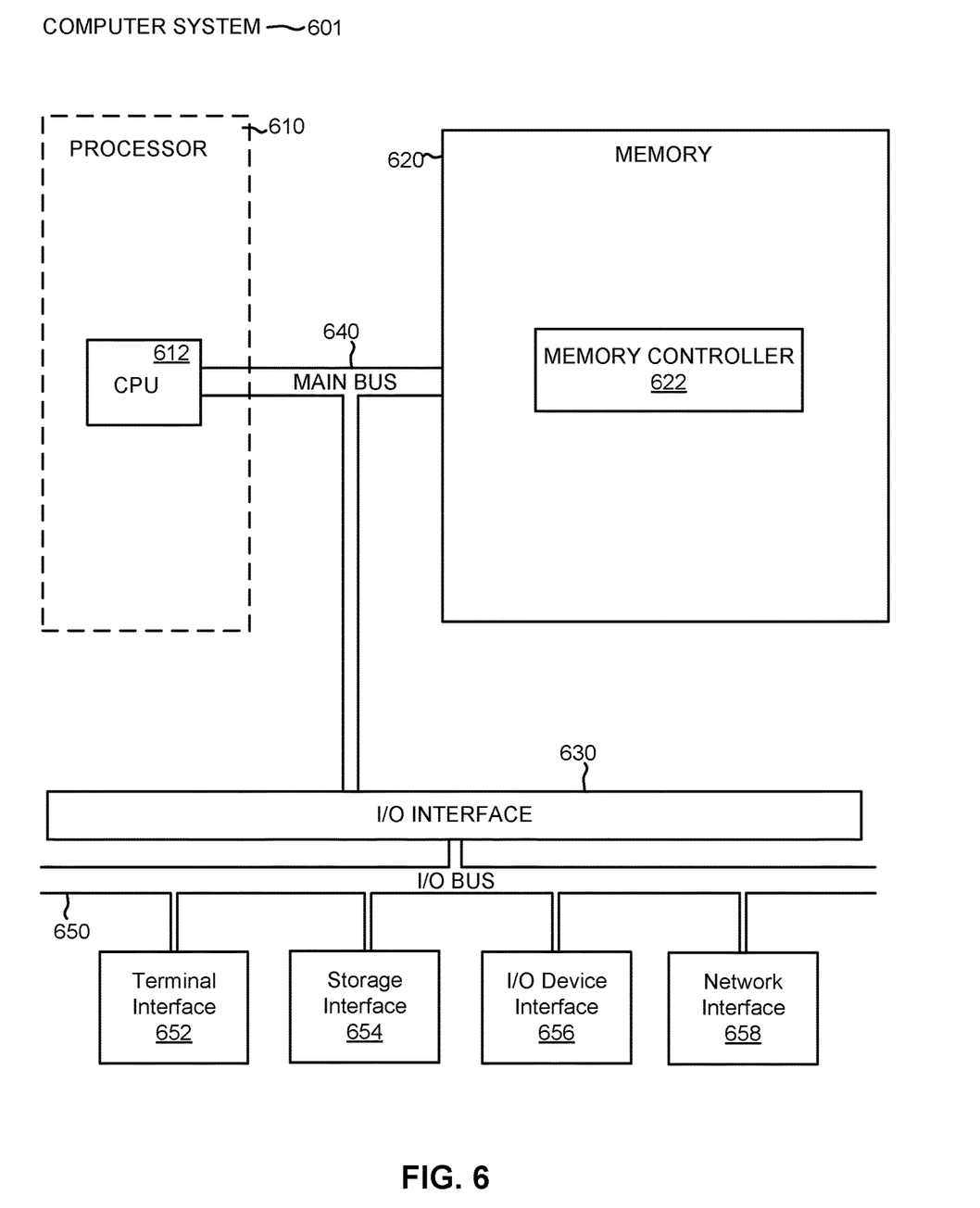
FIG. 6 depicts the representative major components of a computer system that may be used in accordance with embodiments of the present disclosure.

FIG. 6 depicts the representative major components of an exemplary Computer System 601 that may be used in accordance with embodiments of the present disclosure. The particular components depicted are presented for the purpose of example only and are not necessarily the only such variations. The Computer System 601 may comprise a Processor 610, Memory 620, an Input/Output Interface (also referred to herein as I/O or I/O Interface) 630, and a Main Bus 640. The Main Bus 640 may provide communication pathways for the other components of the Computer System 601. In some embodiments, the Main Bus 640 may connect to other components such as a specialized digital signal processor (not depicted). In some embodiments Computer System 601 may be a host system hosting a web executable. In the same or other embodiments Computer System 601 may also perform preliminary program analysis of a web executable, develop an oracle from the results of preliminary program analysis of the executable, tune the runtime monitoring of the executable, monitor the executable at runtime, or a combination of the above.

The Processor 610 of the Computer System 601 may be comprised of one or more CPUs 612. The Processor 610 may additionally be comprised of one or more memory buffers or caches (not depicted) that provide temporary storage of instructions and data for the CPU 612. The CPU 612 may perform instructions on input provided from the caches or from the Memory 620 and output the result to caches or the Memory 620. The CPU 612 may be comprised of one or more circuits configured to perform one or methods consistent with embodiments of the present disclosure. In some embodiments, the Computer System 601 may contain multiple Processors 610 typical of a relatively large system. In other embodiments, however, the Computer System 601 may be a single processor with a singular CPU 612.

The Memory 620 of the Computer System 601 may be comprised of a Memory Controller 622 and one or more memory modules for temporarily or permanently storing data (not depicted). In some embodiments, the Memory 620 may comprise a random-access semiconductor memory, storage device, or storage medium (either volatile or non-volatile) for storing data and programs. The Memory Controller 622 may communicate with the Processor 610, facilitating storage and retrieval of information in the memory modules. The Memory Controller 622 may communicate with the I/O Interface 630, facilitating storage and retrieval of input or output in the memory modules. In some embodiments, the memory modules may be dual in-line memory modules.

The I/O Interface 630 may comprise an I/O Bus 650, a Terminal Interface 652, a Storage Interface 654, an I/O Device Interface 656, and a Network Interface 658. The I/O Interface 630 may connect the Main Bus 640 to the I/O Bus 650. The I/O Interface 630 may direct instructions and data from the Processor 610 and Memory 620 to the various interfaces of the I/O Bus 650. The I/O Interface 630 may also direct instructions and data from the various interfaces of the I/O Bus 650 to the Processor 610 and Memory 620. The various interfaces may comprise the Terminal Interface 652, the Storage Interface 654, the I/O Device Interface 656, and the Network Interface 658. In some embodiments, the various interfaces may comprise a subset of the aforementioned interfaces (e.g., an embedded computer system in an industrial application may not include the Terminal Interface 652 and the Storage Interface 654).

Logic modules throughout the Computer System 601—including but not limited to the Memory 620, the Processor 610, and the I/O Interface 630—may communicate failures and changes to one or more components to a hypervisor or operating system (not depicted). The hypervisor or the operating system may allocate the various resources available in the Computer System 601 and track the location of data in Memory 620 and of processes assigned to various CPUs 612. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
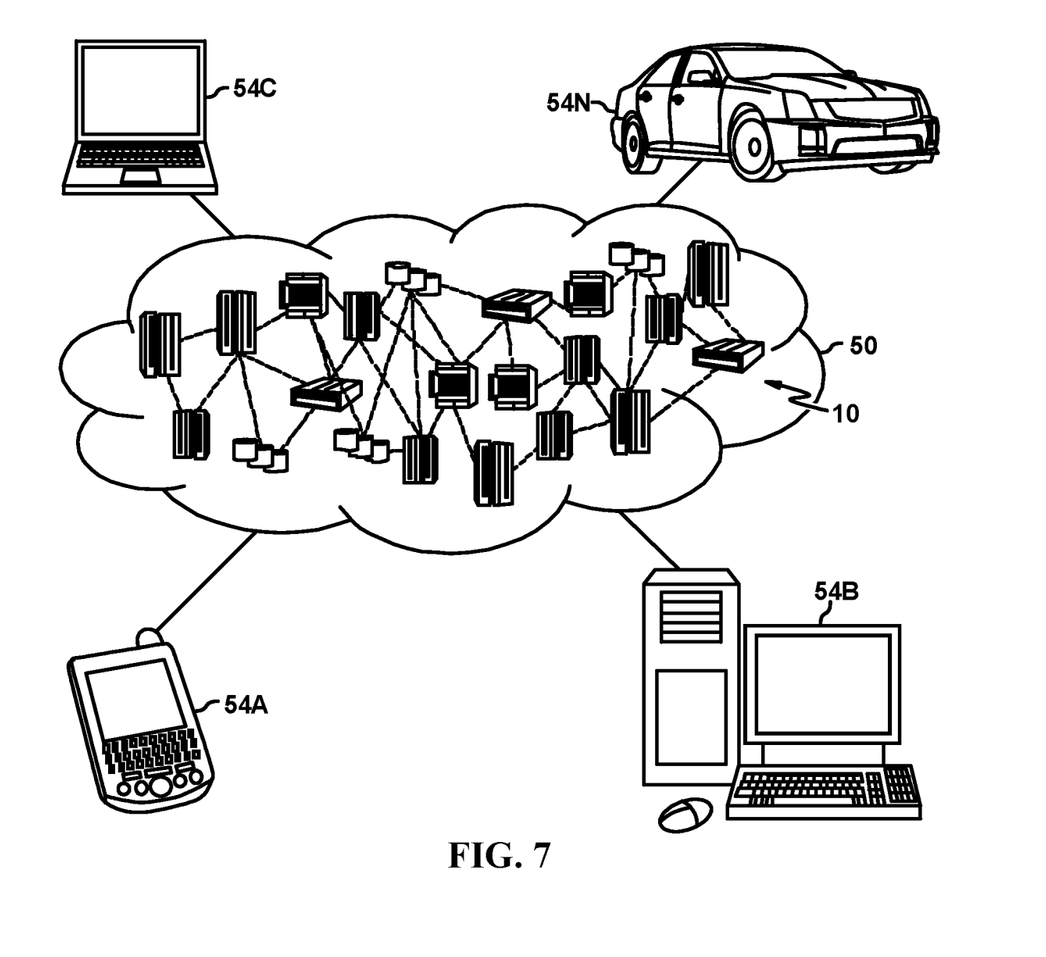
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
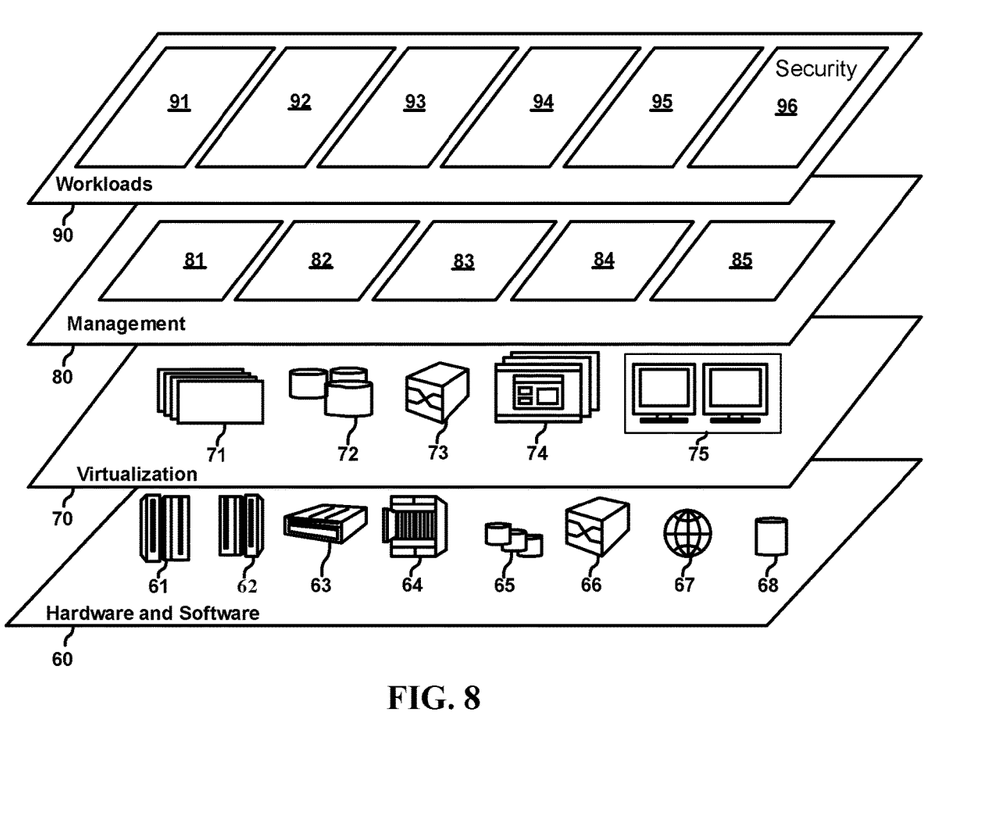
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   performing, by a processor, preliminary program analysis of an executable;
   determining, by the processor and based on the preliminary program analysis, a security vulnerability level of a portion of the executable;
   comparing, by the processor, the security vulnerability level of the portion to a security vulnerability threshold; and
   tuning, by the processor, the precision of runtime monitoring of the portion based the comparing, wherein the tuning occurs when the executable is executed.

2. The method of claim 1, wherein the comparing comprises determining that the security vulnerability level of the portion is higher than the security vulnerability threshold, and the tuning comprises configuring the runtime system to monitor the portion with a high level of precision based on the comparing.

3. The method of claim 2, further comprising:
   determining, by the processor and based on the preliminary program analysis, a second security vulnerability level of a second portion of the executable;
   comparing, by the processor, the second security vulnerability level of the second portion to the security vulnerability threshold;
   determining that the second security vulnerability level of the second portion is lower than the security vulnerability threshold; and
   tuning, by the processor and based on determining that the second security vulnerability level of the second portion is lower than the security vulnerability threshold, the precision of runtime-monitoring of the second portion with a low level of precision.

4. The method of claim 1, further comprising:
   determining, by the processor and based on the comparing, that the security vulnerability level of the portion is lower than the security vulnerability threshold;
   comparing, by the processor, the security vulnerability level of the portion to a second vulnerability threshold, wherein the second vulnerability threshold is lower than the first vulnerability threshold;
   determining, by the processor, based on the comparing the security vulnerability level of the portion to the second vulnerability threshold, that the security vulnerability level of the portion is above the second vulnerability threshold; and
   configuring, by the processor and the tuning, the runtime system to monitor the portion with an intermediate level of precision based on the determining that the security vulnerability of the portion is higher than the second security vulnerability threshold.

5. The method of claim 1, wherein the preliminary program analysis is a form of static analysis.

6. The method of claim 5, wherein the static analysis is shape analysis.

7. The method of claim 6, wherein the shape analysis is restricted to execution prefixes of the executable.

8. The method of claim 1, wherein the preliminary program analysis is a form of offline testing.

9. The method of claim 1, wherein the preliminary program analysis is a form of runtime monitoring.

10. The method of claim 9, wherein the runtime monitoring has been tuned in a previous runtime monitoring tuning process.

11. The method of claim 1, wherein the preliminary program analysis is taint analysis.

12. The method of claim 11, wherein taint analysis is restricted to non-immutable variables.

13. The method of claim 1, wherein the portion is an execution prefix and wherein the comparing comprises determining an execution prefix length limit beyond which the security vulnerability level of the portion falls below the security vulnerability threshold.

14. The method of claim 1, wherein the tuning is performed when the executable is integrated into a computer system.

15. The method of claim 1, wherein the tuning is performed on a periodic basis.

16. A system comprising:
   a processor; and
   a memory in communication with the processor, the memory containing program instructions that, when executed by the processor, are configured to cause the processor to perform a method, the method comprising:
      performing, by a processor, preliminary program analysis of an executable wherein the preliminary program analysis is shape analysis;
      determining, by the processor and based on the preliminary program analysis, a security vulnerability level of a portion of the executable;

comparing, by the processor, the security vulnerability level of the portion to a security vulnerability threshold; and tuning, by the processor, the precision of runtime monitoring of the portion based the comparing.

17. The system of claim 16, wherein the comparing comprises determining that the security vulnerability level of the portion is higher than the security vulnerability threshold, and the tuning comprises configuring the runtime system to monitor the portion with a high level of precision based on the comparing.

18. A computer program product, the computer program product comprising a computer readable storage medium having program instructions embodied therewith, the program instructions executable by a computer to cause the computer to:

perform, by a processor, preliminary program analysis of an executable, wherein the preliminary program analysis is taint analysis that is restricted to non-immutable variables;

determine, by the processor and based on the preliminary program analysis, a security vulnerability level of a portion of the executable;

compare, by the processor, the security vulnerability level of the portion to a security vulnerability threshold; and tune, by the processor, the precision of runtime monitoring of the portion based the comparing.

19. The computer program product of claim 18, wherein the program instructions further cause the computer to:

determine, by the processor and based on the comparing, that the security vulnerability level of the portion is lower than the security vulnerability threshold;

compare, by the processor, the security vulnerability level of the portion to a second vulnerability threshold, wherein the second vulnerability threshold is lower than the first vulnerability threshold;

determine, by the processor, based on the comparing the security vulnerability level of the portion to the second vulnerability threshold, that the security vulnerability level of the portion is above the second vulnerability threshold; and configure, by the processor and the tuning, the runtime system to monitor the portion with an intermediate level of precision based on the determining that the security vulnerability of the portion is higher than the second security vulnerability threshold.

* * * * *